United States Patent
Doelker et al.

(10) Patent No.: US 6,863,051 B2
(45) Date of Patent: Mar. 8, 2005

(54) DIAGNOSTIC FUNCTION FOR AN INTERNAL COMBUSTION ENGINE

(75) Inventors: Armin Doelker, Immenstaad (DE); Thomas Spaegele, Tettnang (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 0 days.

(21) Appl. No.: 10/312,840

(22) PCT Filed: Jun. 28, 2001

(86) PCT No.: PCT/EP01/07393
§ 371 (c)(1),
(2), (4) Date: Sep. 25, 2003

(87) PCT Pub. No.: WO02/02922
PCT Pub. Date: Jan. 10, 2002

(65) Prior Publication Data
US 2004/0055567 A1 Mar. 25, 2004

(30) Foreign Application Priority Data
Jul. 1, 2000 (DE) .......................... 100 32 110

(51) Int. Cl.⁷ ............................. F02D 41/22
(52) U.S. Cl. .................. 123/352; 123/357; 123/435; 123/480

(58) Field of Search .................. 123/350, 352–355, 123/357–359, 435, 446, 478, 479, 480; 701/102, 114

(56) References Cited

U.S. PATENT DOCUMENTS 5,727,528 A * 3/1998 Hori et al. ................. 123/486
6,786,195 B2 * 9/2004 Doelker ................. 123/339.21

FOREIGN PATENT DOCUMENTS

| DE | 197 42 083 A1 | 9/1997 |
| DE | 199 53 767 A1 | 11/1999 |
| EP | 0 814 251 A2 | 12/1997 |

* cited by examiner

Primary Examiner—Tony M. Argenbright
(74) Attorney, Agent, or Firm—Crowell & Moring LLP

(57) ABSTRACT

A diagnostic function for an internal-combustion engine whose power is set by way of a power-determining signal that is determined from a first signal from a determination device, and a second signal determined by a torque controller, based on engine torque. A selection device sets either the determination device or the torque controller to be dominant for the power determining signal. When the values of the engine torque are not plausible, an error mode is set. With the setting of the error mode, the dominance is retained when the determination device is dominant. When the torque controller is dominant, a change of the dominance takes place.

9 Claims, 7 Drawing Sheets

DIAGNOSTIC FUNCTION FOR AN INTERNAL COMBUSTION ENGINE

This application claims the priority of German patent document 100 32 110.00, filed Jul. 1, 2000 (PCT International Application No. PCT/EP01/07393, filed Jun. 28, 2001), the disclosure of which is expressly incorporated by reference herein.

BACKGROUND AND SUMMARY OF THE INVENTION

The invention relates to a diagnostic function for an internal-combustion engine whose power is adjusted by a power-determining signal. For this purpose, a determination unit determines a first signal based on a desired-value definition, and a torque controller determines a second signal from an engine torque. A selection device then sets either the determination device or the torque controller to be dominant for the power determining signal.

German Patent Document DE 19953767.4, (not prior art) discloses a control circuit structure having the above-mentioned construction, in which the determination device corresponds, for example, to the rotational speed controller. The rotational speed controller determines the first signal (for example, a first injection quantity) based on the desired rotational speed value definition. A torque controller determines a second signal (for example, a second injection quantity) from the engine torque and a maximum permissible torque. The selection device then sets as dominant, the controller whose calculated injection quantity is lowest. In this manner the internal-combustion engine is effectively protected from being overloaded. However, an error in the torque detection or calculation is not yet taken into account in the case of this control circuit structure.

One object of the present invention is to provide a control system that includes a failure prevention device.

This and other objects and advantages are achieved by the method and apparatus according to the invention, in which an error mode is set when values of the engine torque are not plausible. With the setting of the error mode, if the determination unit is then currently dominant, the dominance is maintained. On the other hand, when the torque controller is dominant, a change of dominance will then be carried out.

According to an embodiment of the invention, the change of dominance takes place after a transition function. As a further feature, the engine torque is controlled from the last plausible value to zero or, alternatively the second signal is controlled from the last value to a high value.

The method and apparatus according to the invention and further developments thereof offer the advantage that a failure in the torque detection will not result in an uncontrolled behavior of the internal-combustion engine. In other words, even when the torque detection fails, a reduced normal operation of the internal-combustion engine will be ensured continuing computation of the power-determining signal. Introduction of the transition function prevents a jump in the power-determining signal during a change in dominance. A power-determining signal in the sense of the invention is an injection quantity or a control path of a control rod.

Another protective measure of the internal-combustion engine in the event of a failure of the torque detection lies in using the diagnostic function adapting a limit value curve of the maximum permissible first signal. This limit value curve is adapted to the lower values of the first signal. The internal-combustion engine is thereby operated at a safe power level in that, for example, the injection quantity is reduced.

A corresponding return function within the diagnostic function reacts to sporadically occurring errors in the torque detection. As soon as plausible torque values are present again and a time period has elapsed, the return will take place to the normal function.

Other objects, advantages and novel features of the present invention will become apparent from the following detailed description of the invention when considered in conjunction with the accompanying drawings.

DETAILED DESCRIPTION OF THE DRAWINGS

Figure 1:
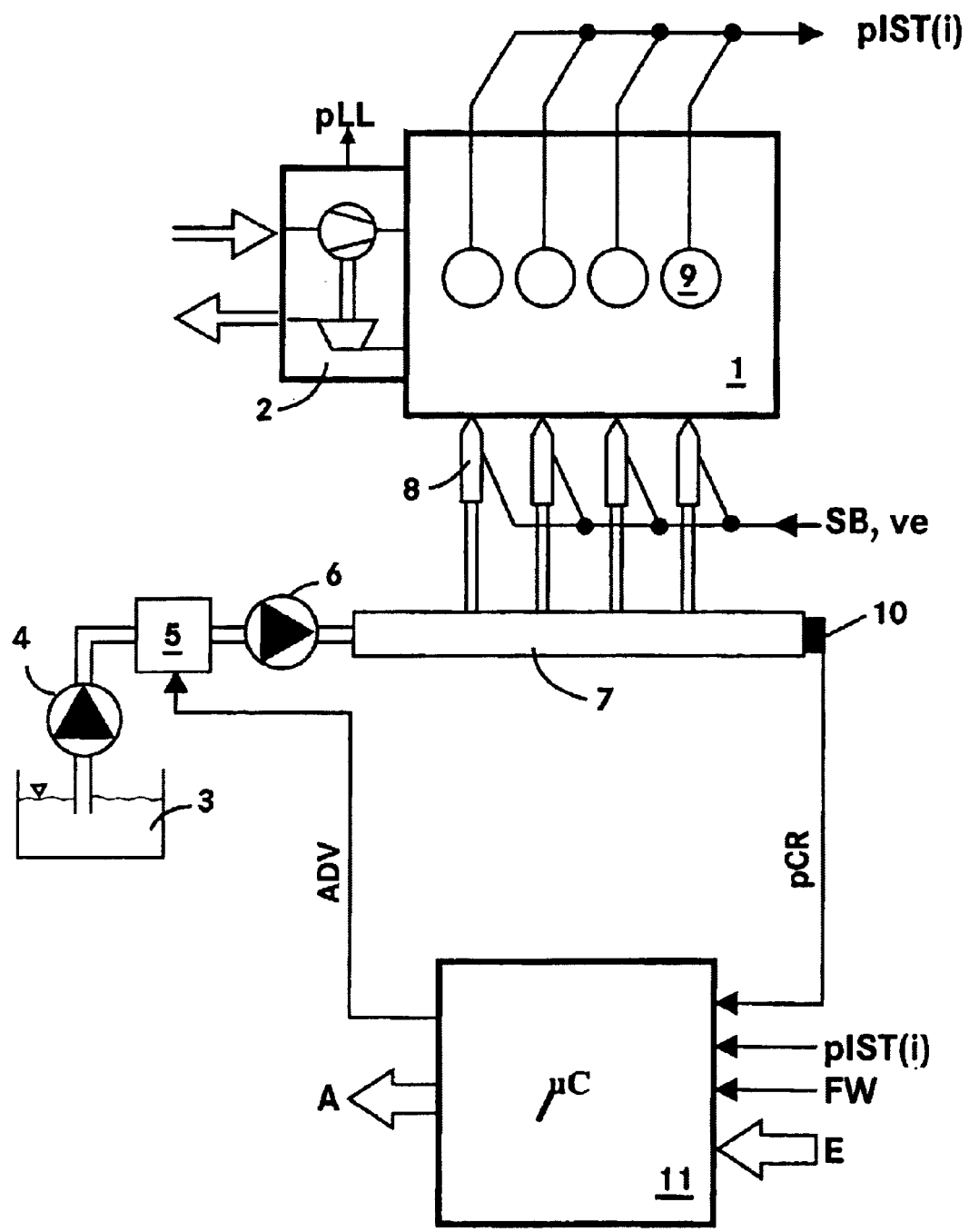
FIG. 1 is a schematic diagram of a system according to the invention.

FIG. 1 is a system diagram of an internal-combustion engine with an accumulator-type injection system (common rail), which includes an internal-combustion engine 1 with a turbocharger and a charge air cooler 2, an electronic engine control unit 11, a first pump 4, a second pump 6, a high-pressure accumulator (rail) 7, injectors 8 connected thereto, and a throttle valve 5. The first pump 4 delivers the fuel from a fuel tank 3 by way of the throttle valve 5 to the second pump 6. The latter, in turn, delivers the fuel at a high pressure into the high-pressure accumulator 7. The pressure level of the high-pressure accumulator 7 is detected by means of a rail pressure sensor 10. Lines with injectors 8 connected thereto for each cylinder of the internal-combustion engine branch off from the high-pressure accumulator 7.

The electronic engine control unit 11, which controls and regulates the condition of the internal-combustion engine 1, includes a microcomputer system, such as a microprocessor, I/O modules, buffers and memory chips (EEPROM, RAM). In the memory chips, the operating data relevant to the operation of the internal-combustion engine are applied in characteristic diagrams/characteristic curves. The input quantities of the electronic engine control unit 11 illustrated as examples in FIG. 1 are: The maximum combustion pressure plSt(i) which is measured by means of pressure sensors 9; the pressure pCR of the high-pressure accumulator 7, as well as a signal FW illustrating the power request. The other input quantities relevant to the operation of the internal-combustion engine 1 are indicated by the reference symbol E. As the output quantities A of the electronic engine control unit 11, the control signals for the injectors 8, corresponding to the injection start SB, a power-determining signal ve, and the control signal ADV for the throttle valve 5 are shown. The feed to the second pump 6 is adjusted by the throttle valve 5.

Figure 2A:
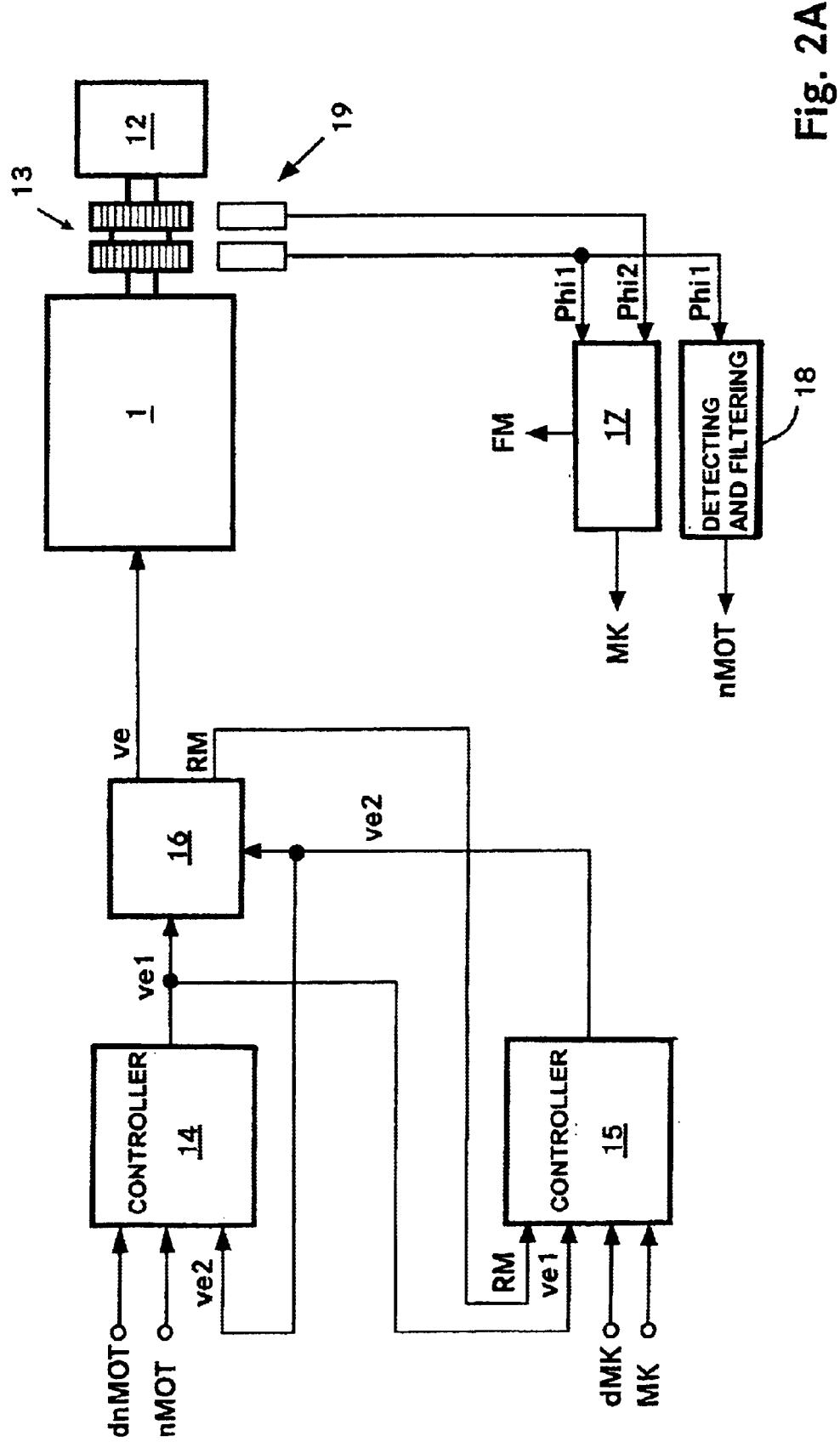
FIGS. 2A, 2B are block diagrams that show the control circuit structure with a rotational speed and torque controller.

FIG. 2A shows a block diagram of the regulating system of the internal-combustion engine 1 with the coupled control circuit structure. The following are shown: A rotational speed controller 14, a torque controller 15, a selection device 16 and the internal-combustion engine 1 with the injection system. The internal-combustion engine 1 drives an engine load 12, such as a waterjet drive, by way of a clutch 13. The tooth angles Phi1 and Phi2 of the clutch 13 are detected by rotational speed sensors 19. From the tooth angle Phi1, the rotational engine speed nMOT is computed by way of a detection/filtering function block 18. From the two tooth angles Phi1 and Phi2, the engine torque MK is determined and evaluated in the diagnostic block 17.

The input quantities of the rotational speed controller 14 are: The engine rotational speed nMOT, a rotational speed difference dnMOT and a signal ve2, in the following, called a second signal.

The rotational speed difference is computed from the rotational engine speed nMOT and a desired rotational speed value nMOT(SW) characterizing the requested power. The second signal ve2 corresponding to the output signal of the torque controller 15. The output quantity of the rotational speed controller 14 is a first signal ve1, such as an injection quantity. This signal is guided to the selection device 16 and the torque controller 15. The input quantities of the torque controller 16 are: The engine torque MK, a differential torque dMK, the first signal ve1 and a controller mode RM. The differential torque dMK is computed from the deviation of the engine torque MK with respect to a maximally permissible engine torque. The output signal of the torque controller 15 is the second signal ve2. This signal is guided to the selection device 16 and the rotational speed controller 14.

The selection device 16 determines which of the two controllers 14 and 15 is dominant. For this purpose, the selection device 16 contains a minimum value selection, which is used to set the first signal ve1 as the power-determining signal ve if the first signal ve1 is smaller than or equal to the second signal ve2. In this event, the controller mode RM is to set a first value. This corresponds to an operation of the internal-combustion engine in the rotational speed mode. The second signal ve2 is set as the power determining signal ve if it is smaller than the first signal ve1, in which case the controller mode RM is set to a second value corresponding to an operation of the internal-combustion engine in the torque limiting mode. The output signals of the selection device 16 are the power-determining signal ve and the controller mode RM. The power-determining signal ve is guided to the injection device of the internal-combustion engine 1. In the sense of the invention, a power-determining signal ve may be the injection quantity or the control path of a control rod.

Figure 5:
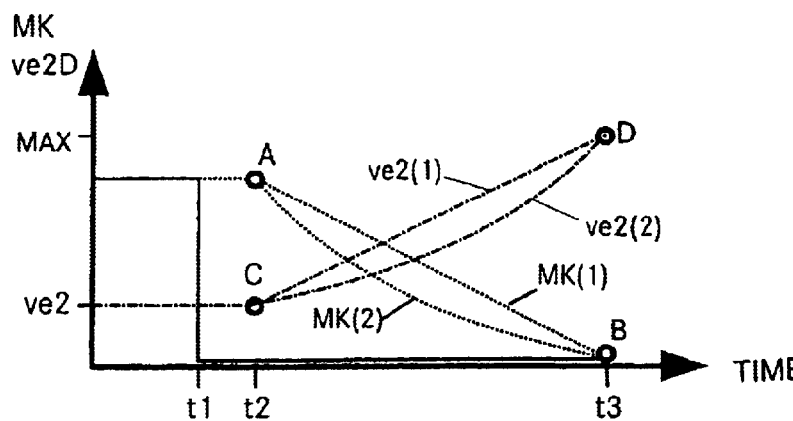
FIG. 5 is a time diagram which illustrates the operation of the invention.

The process takes place as follows: When implausible values of the engine torque MN are detected, the diagnostic block 17 sets an error mode FM to one. (Implausible values are present, for example, when the signal Phi1 is absent because of a line breakdown.) With the setting of the error mode FM, the diagnostic block 17 adjusts the engine torque MK to zero from its last plausible value, according to a transition function. The transition function, which may be implemented as a mathematical function or by way of a filter, is illustrated in FIG. 5 and is explained in conjunction with the latter. As a result of the now decreasing engine torque MK, the torque controller 15 computes a greater value of the second signal ve2. The diagnostic block 17 therefore has an indirect effect on the second signal ve2.

Consequently, when the rotational speed controller 14 is dominant, it remains dominant. When the torque controller 15 is dominant, the second signal ve2 will be increased until it reaches the value of the first signal ve1. Then a transition takes place with respect to the dominance from the torque controller to the rotational speed controller.

Figure 2B:
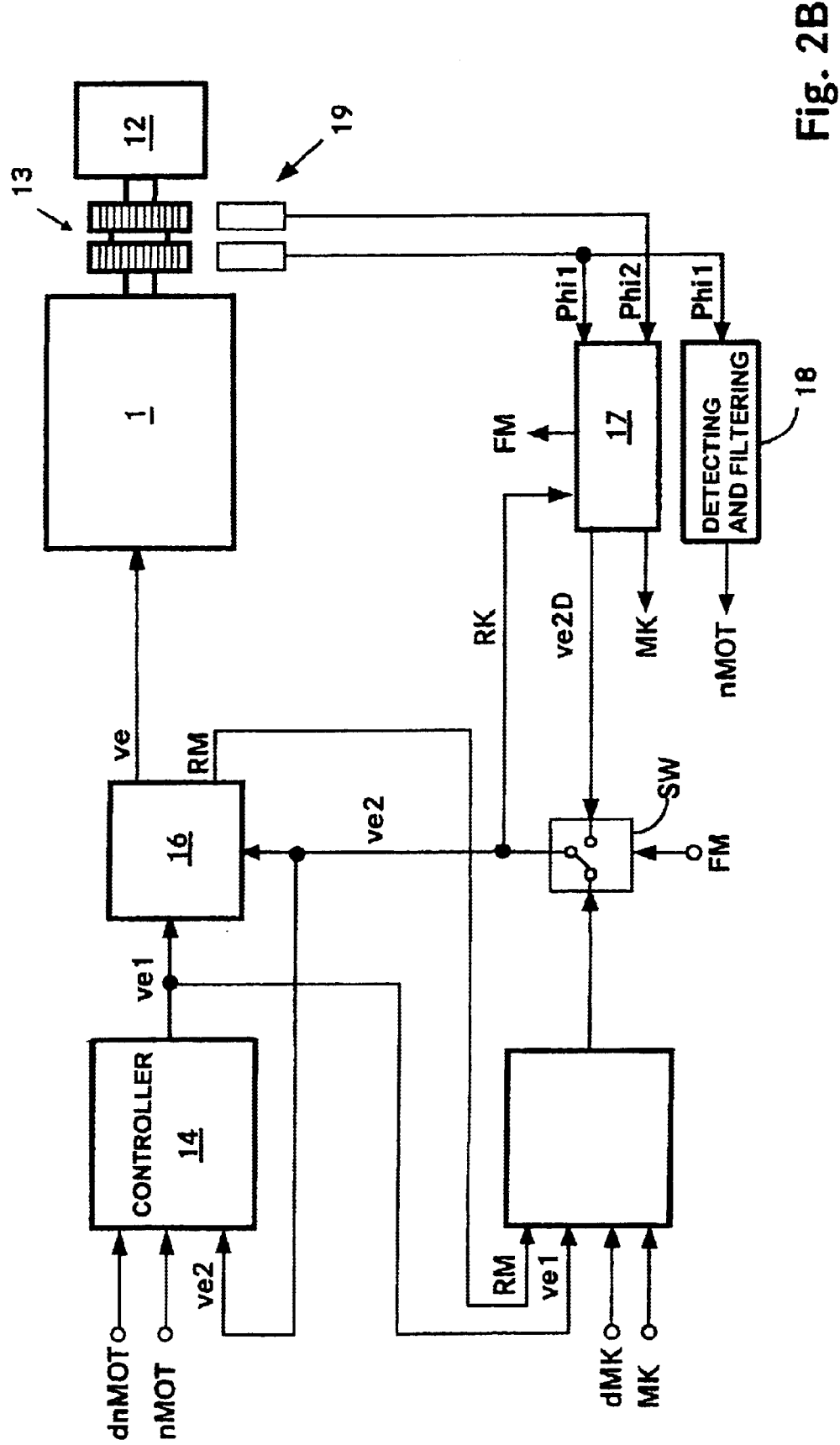

FIG. 2B shows an alternative to FIG. 2A. In this alternative, a software switch SW is provided. The software switch SW is controlled by the signal error mode FM. In the normal operation—error mode FM equal to zero—, the software switch SW is in the marked position. In this position, the second signal ve2 corresponds to the output signal of the torque controller 15. By way of a feedback path RK, the second signal ve2 is guided to the diagnostic block 17. The feedback path RK is activated only in the normal operation. The value of the signal ve2D corresponds to the value of the second signal ve2.

In the case of implausible values of the engine torque MK, the diagnostic block 17 sets the error mode FM to one. As a result, the position of the software switch SW will change. In this position, the second signal ve2 is determined by way of the signal ve2D of the diagnostic block 17. Since, by way of the feedback path RK, the signal ve2D is caused to follow the second signal ve2, no jump occurs in the second signal ve2 when the position of the software switch SW is changed. With the setting of the error mode, the diagnostic block 17 controls the second signal ve2 according to a transition function to a maximal value MAX.

Figure 3A:
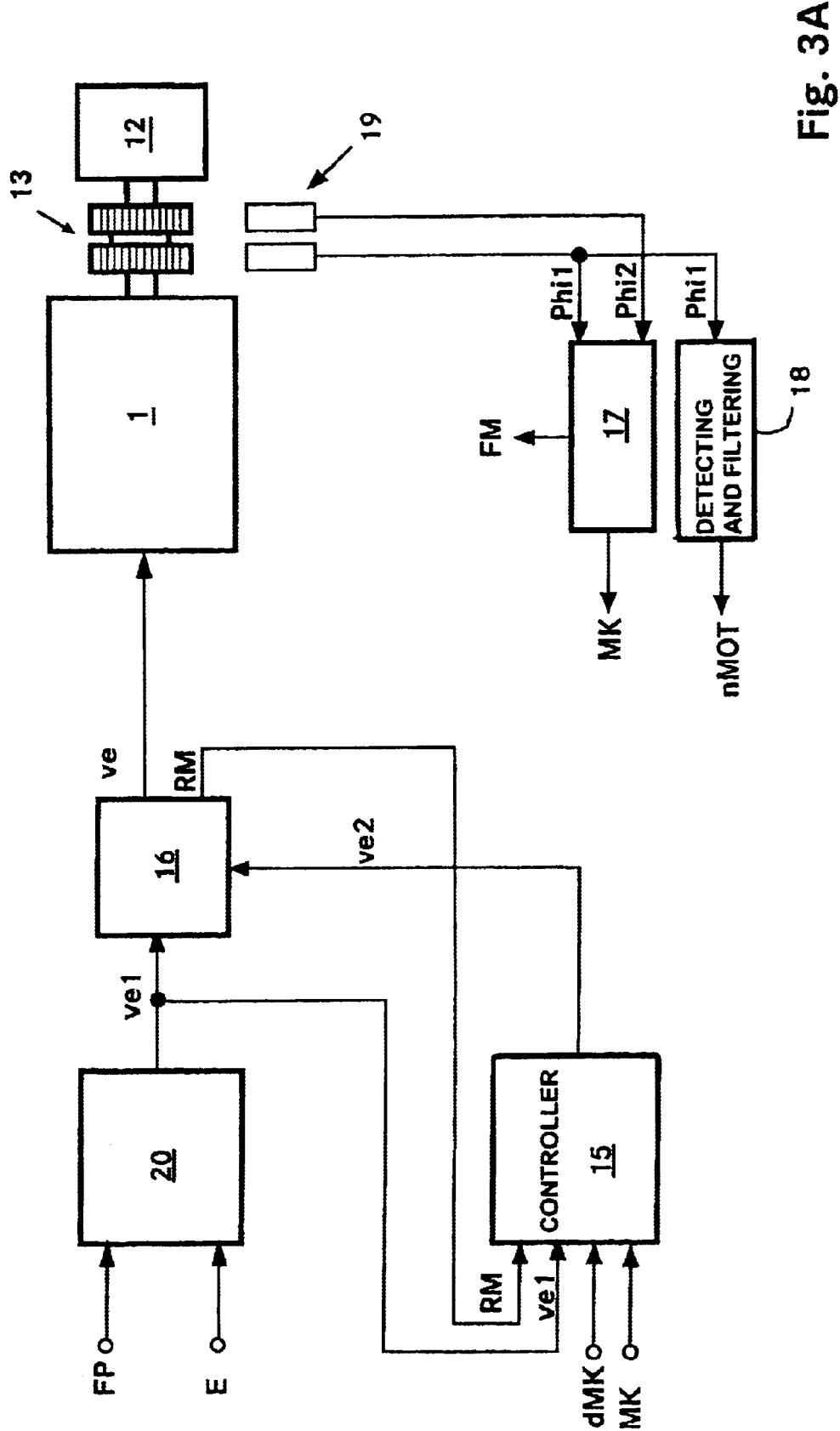
FIGS. 3A, 3B are block diagrams that show the control circuit with the control system.

FIG. 3A shows another alternative embodiment of the block diagram of FIG. 2A. In contrast to FIG. 2A, in this block diagram, the signal ve1 is computed by a function block 20 depending on a power request (here, for example, the accelerator pedal FP). The function block 20 contains the conversion of the accelerator pedal position to the first signal ve1. For this purpose, corresponding characteristic curves are provided, including a limit-value curve (DBR curve). The input quantities required for the conversion are indicated by means of reference symbol E, for example, the rotational engine speed nMOT, charge air pressure pLL, etc. The further construction and the functionality correspond to that of FIG. 2A, so that the information indicated there also applies here.

Figure 3B:
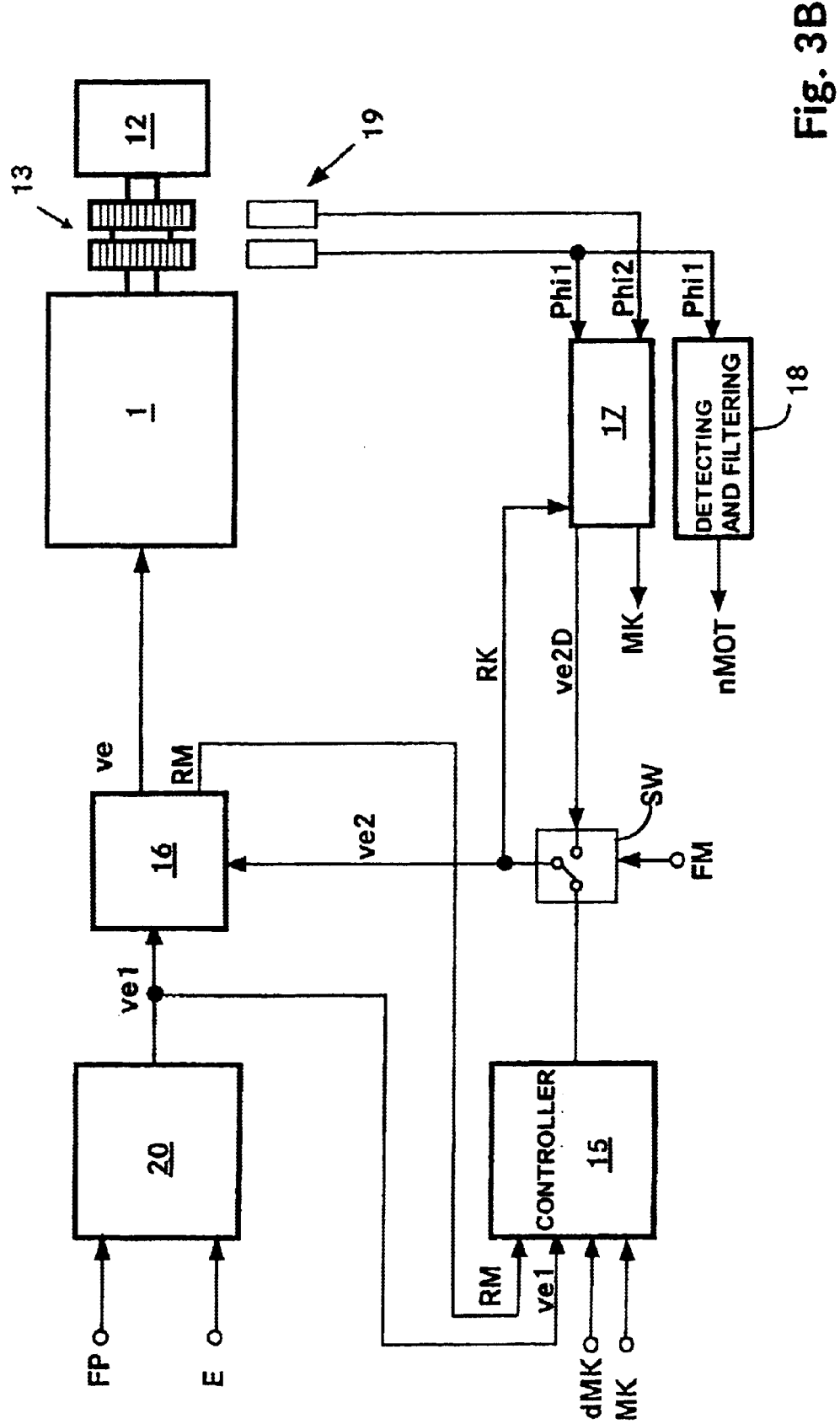

FIG. 3B shows an alternative embodiment of the block diagram of FIG. 2B. In contrast to FIG. 2B, in this block diagram, the signal ve1 is computed by a function block 20 depending on a power request (for example, the accelerator pedal FP). The function block 20 contains the conversion of the accelerator pedal position to the first signal ve1. For this purpose, corresponding characteristic curves are provided, including a limit-value curve (DBR curve). The input quantities required for the conversion are indicated by reference symbol E (for example, the rotational engine speed nMOT, the charge air pressure pLL, etc). The further construction and the functionality correspond to that of FIG. 2B, so that the information indicated there also applies here.

Figure 4:
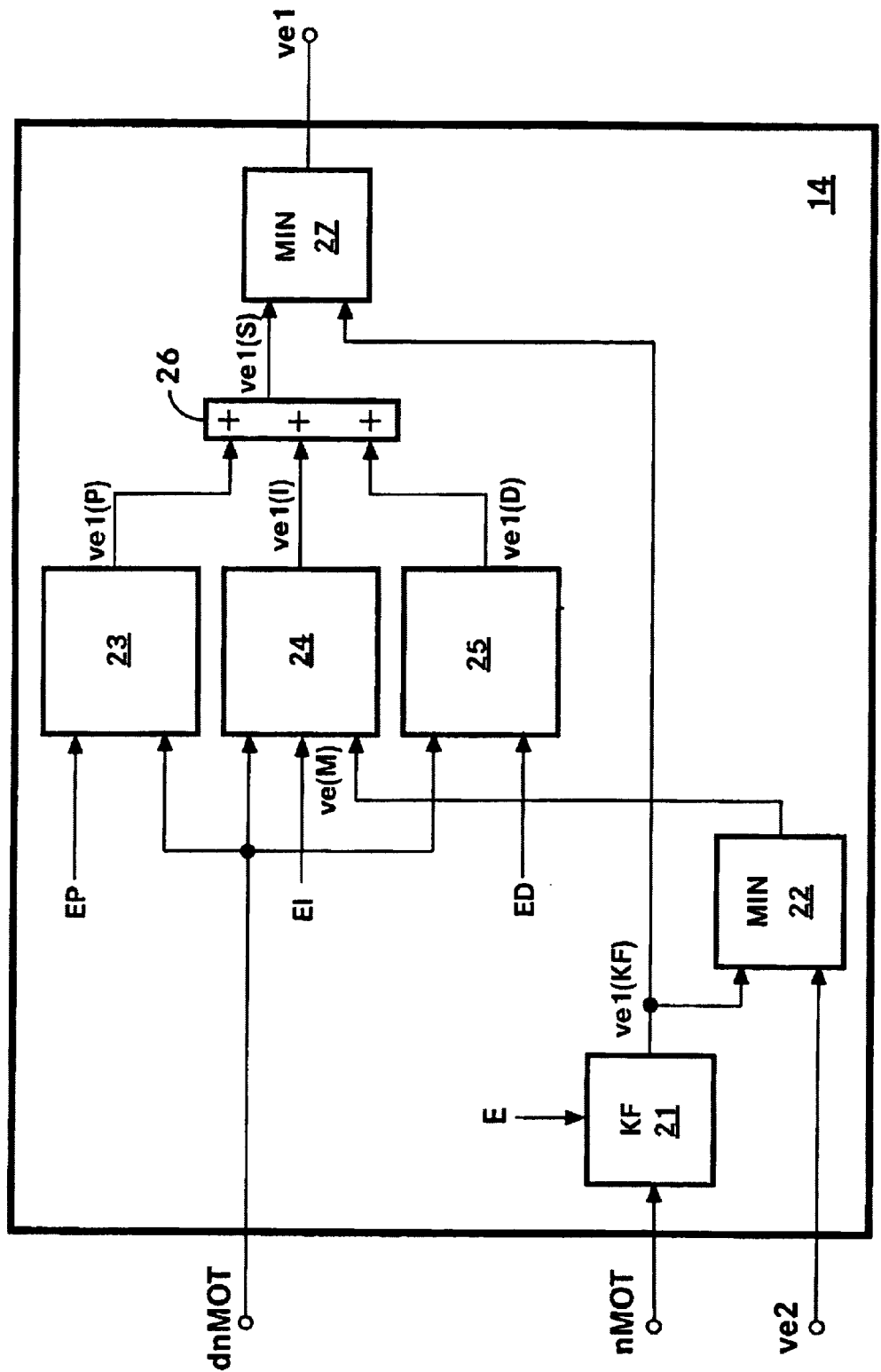
FIG. 4 is a block diagram of the rotational speed controller.

FIG. 4 shows the rotational speed controller 14. The latter has an integrating fraction and is illustrated, for example, as a PID controller. In practice, the rotational speed controller may also be constructed as a PI- or PI(DT1) controller. The input quantities of the rotational speed controller 14 are: The rotational speed difference dnMOT, the rotational engine speed nMOT and the second signal ve2. The illustrated rotational speed controller contains three function blocks for computing the P-, I- and D-fraction, corresponding to the reference numbers 23 to 25. In function block 23, the P-fraction ve1(P) is determined from an input quantity EP and the rotational speed difference dnMOT, while in function block 24, the I-fraction ve1(I) is computed from the rotational speed difference dnMOT, a first input signal ve(M) and a second input signal EI. (The I-fraction ve1(I) is limited to the first input signal ve(M).) In function block 25, the D-fraction ve1(D) is computed from the rotational speed difference dnMOT and an input quantity ED. The first input signal ve(M) corresponds either to the second signal ve2 or to a signal ve1(KF) depending on which signal has the lower significance. For this purpose, a first function block minimum value 22 is provided. The signal ve1(KF), in turn, is determined from the rotational engine speed nMOT and additional input quantities E by way of characteristic diagrams 21. A limit-value curve (DBR curve) is also contained. The additional input quantities are illustrated as the collective reference symbol E. The input quantities E may, for example, be the charge air pressure pLL, the rotational engine speed nMOT, etc.

All three fractions, that is, ve1(P) and ve1(I) and ve1(D), are added by a summation element 26 to a common signal ve1(S). The second function block "minimal value" 27, selects from this signal ve1(S) and from signal ve1(KF), that signal which has the lowest significance. The selected signal corresponds to the first signal ve1.

The second signal ve2 computed by the torque controller 15 influences the calculation of the integrating fraction ve1(I) of the rotational speed regulator 14. In order to avoid a direct feedback of the output of the rotational speed controller 14 to the integrating fraction ve1(I) of the rotational speed controller 14 by the torque controller 15, the second signal ve2 may be filtered. In the case of implausible values of the engine torque MK, the error mode FM is set. As a result by way of the diagnostic function, the second signal ve2 is increased. As a result of the minimum value 22, the signal ve1(KF) becomes effective even when the torque controller 15 is dominant. In order to protect the internal-combustion engine from excessive values of the signal ve1(KF), for example, an excessive fuel quantity, by way of the characteristic diagrams 21, the signal ve1(KF) is adapted to lower values. This takes place in that a limit-value curve (DBR-curve) of the characteristics diagrams 21 is changed.

FIG. 5 is a time diagram that illustrates the operation of the invention. Here, the time is indicated on the abscissa and the engine torque MK and the second signal ve2D are indicated on the ordinate. (The measured engine torque MK is illustrated as a solid line, while engine torques MK(1) and MK(2) respectively emitted by the diagnostic block 17 are illustrated as broken lines.) The alternative solution is shown as a dash-dotted line, in which the diagnostic block 17 increases the second signal ve2 by way of the signal ve2D.

At the point in time t1, the engine torque MK decreases from the value of point A to zero, for example, because of a sensor failure, and remains at zero thereafter. At a point in time t2, the diagnostic function detects that the engine torque MK is no longer plausible, and then controls the value of the engine torque MK according to a transition function to the zero value, point B, at the point in time t3. In a first embodiment, this transition function may be a linear function MK(1). As an alternative, it may also correspond to a filtering function MK(2) with a parabolic course. The reduction of the engine torque MK(1) or MK(2) emitted by the diagnostic block consequently causes an increase of the second signal ve2. The diagnostic block 17 therefore acts indirectly upon the second signal ve2.

In an alternative embodiment, it is provided that the diagnostic block 17 acts directly on the second signal ve2, corresponding to FIGS. 2B and 3B. This embodiment is illustrated in FIG. 5 as a dash-dotted line. At the point in time t2, the diagnostic function detects that the engine torque MK is not plausible. In response, the signal ve2 is controlled according to the transition function from the value at point C to the value of point D (point in time t3), by means of the signal ve2D. The temporal course between the two points C and D can be constructed as a mathematical function or filtering function; signal course ve2(1) and ve2(2).

Figure 6:
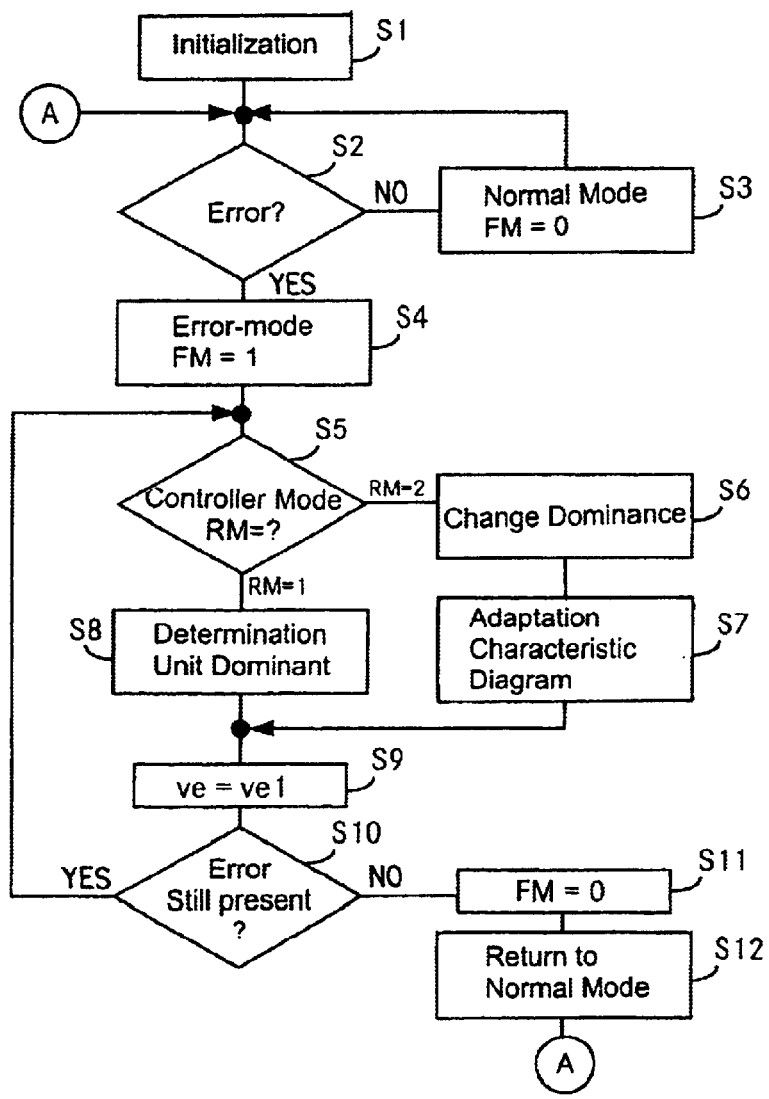
FIG. 6 is a program flow chart which shows the process according to the invention.

FIG. 6 is a program flow chart of the diagnostic function. In Step S1, the function is initialized and initial values are set. In Step S2, it is checked whether an error was detected; that is, whether the engine torque MK is plausible. If no error was detected, the normal mode (FM=0) is set in Step S3 and a waiting loop is implemented. If an error was detected in Step S2, an error mode (FM=1) is set in Step S4. The controller mode RM is queried in Step S5. The controller mode RM corresponds to 1 when the determination device, thus the rotational speed controller 14 or the function block 20, is dominant. In this case, this mode is retained, step S8. The controller mode RM corresponds to 2 when the torque controller 15 is dominant. In this case, a change of the dominance takes place in Step S6 from the torque controller 14 to the determination device. In Step S7, in addition, the limit value curve (DBR) of the maximum permissible first signal ve1 is adapted. In practice, this corresponds, for example, to the reduction of the maximum permissible injection quantity. In Step S9, the first signal ve1 is set as the power-determining signal ve. Subsequently, it is checked in Step S10 whether the error still exists. If so, the process is continued in Step S5. If it is determined in Step S10 that an error is no longer present, the error mode FM is set back to zero in Step 11, with the expiration of a time step. In Step S12, a return takes place to the normal mode. Then, the program flow chart branches to Point A and continues with Step S2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A diagnostic process for an internal-combustion engine whose power is controlled by a power-determining signal, said internal combustion engine including a determination device that determines a first signal from the engine torque, based on a desired value definition, a torque controller that determines a second signal and a selection device that sets either the determination device or the torque controller to be dominant for the power-determining signal; said process comprising:

setting an error mode when values of engine torque are not plausible;

upon setting of the error mode, if the determination device is dominant, retaining the dominance of the determination device; and upon setting of the error mode, if the torque controller is dominant, implementing a change of the dominance.

2. The diagnostic process according to claim 1, wherein the change of dominance is implemented from the torque controller to the determination device according to a transition function by means of a diagnostic block.

3. The diagnostic process according to claim 2, wherein according to the transition function, the engine torque is controlled from a last plausible value to zero.

4. The diagnostic process according to claim 2, wherein according to the transition function, the second signal is controlled from a last plausible value to a higher value.

5. The diagnostic process according to claim 3, wherein the transition function is implemented as one of a mathematical function and a filtering function.

6. The diagnostic process according to claim 4, wherein the transition function is implemented as one of a mathematical function and a filtering function.

7. The diagnostic process according to claim 1, wherein when the error mode is set, a limit value curve providing a maximum permissible first signal is adapted.

8. The diagnostic function according to claim 7, wherein the limit value curve is adapted toward smaller values of the first signal.

9. The diagnostic process according to claim 1, wherein the error mode is set back when plausible values of engine torque moment are detected again, after a time step has expired.

* * * * *